Sept. 25, 1945.  A. H. HOPMANS  2,385,625

HYDRAULIC TRANSMISSION SYSTEM

Filed Dec. 18, 1943  2 Sheets-Sheet 1

INVENTOR.
ARTHUR H. HOPMANS,
BY
ATTORNEY.

Sept. 25, 1945.  A. H. HOPMANS  2,385,625
HYDRAULIC TRANSMISSION SYSTEM
Filed Dec. 18, 1943  2 Sheets-Sheet 2
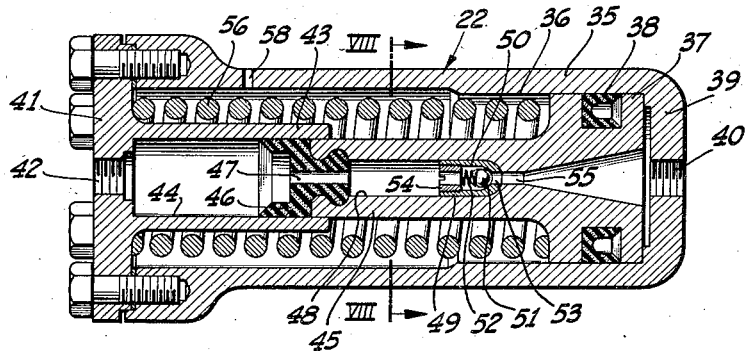
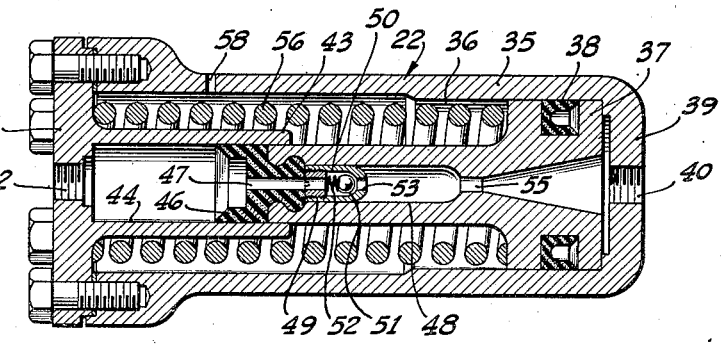
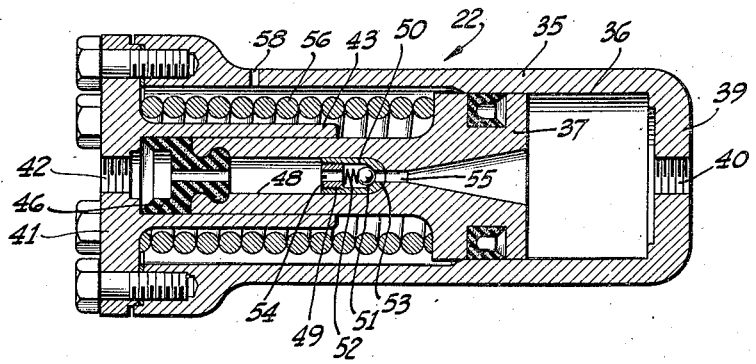
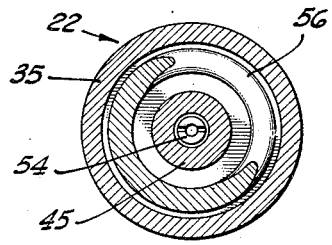
INVENTOR.
ARTHUR H. HOPMANS,
BY
ATTORNEY.

Patented Sept. 25, 1945

2,385,625

UNITED STATES PATENT OFFICE 2,385,625

HYDRAULIC TRANSMISSION SYSTEM

Arthur H. Hopmans, Paulding, Ohio

Application December 18, 1943, Serial No. 514,763

1 Claim. (Cl. 188—152)

My invention relates to a hydraulic power transmission system and has particular reference to a control device for use in hydraulic systems such as hydraulic brakes for automobiles and hydraulically operated clamps and workholding devices, and finds particular utility when employed to maintain the fluid system completely filled with fluid at all times or, alternatively, to maintain a predetermined minimum pressure in the system.

In certain hydraulic power systems, notably the power transmission systems used in hydraulic brakes on automobiles and trucks, the length of stroke required of the driving element or master piston increases as time goes on as a result of the gradual loss of fluid from the system and the wearing away of the brake lining. This condition gradually gets worse and worse until eventually it becomes necessary to readjust the mechanical part of the system as by changing the location of the return stops for the brake shoes in order to insure an adequate travel of the master cylinder. Because of the gradually growing magnitude of the condition referred to, it is not unusual for the readjustment of the system to be postponed until after the system is incapable of developing the braking effort required for safe operation of the vehicle.

The present invention is directed to a mechanism which may be used in hydraulic brake systems and like hydraulic power transmission systems for the purpose of maintaining, alternatively, a given amount of fluid in the system or a given minimum pressure in the system.

It is therefore an object of the present invention to provide a hydraulic power transmission system which overcomes the disadvantages above referred to by including between the driving element and the driven element a check valve constructed and arranged to permit a limited return flow of fluid.

It is also an object of my invention to provide a system of the character referred to in the preceding paragraph in which the check valve is carried in a piston which is in turn mounted for limited movement within a cylinder.

It is an additional object of my invention to provide a system of the character set forth in the preceding paragraphs in which the piston provides a differential area and is continuously urged in one direction as by means of a spring to thereby maintain within the system a predetermined operating pressure.

Other objects and advantages of my invention will be apparent from a study of the following specifications, read in connection with the accompanying drawings, wherein:

Fig. 5 is a longitudinal sectional view of a modified form of check valve arrangement which may be used with the systems shown in Fig. 1 and which is arranged to maintain the predetermined minimum operating pressure in the system, the parts in Fig. 5 being shown in the positions they normally occupy when no braking effort is being developed;

Fig. 6 is a view similar to Fig. 5 but illustrating the relative positions occupied by the parts when the slack or play is taken out of the brakes or driven elements of the system;

Fig. 7 is a view similar to Figs. 5 and 6 but showing the relative positions occupied by the parts during the time braking effort is being developed by the hydraulic brakes; and Fig. 8 is a cross sectional view taken substantially along the line VIII—VIII of Fig. 5.

Figure 1:
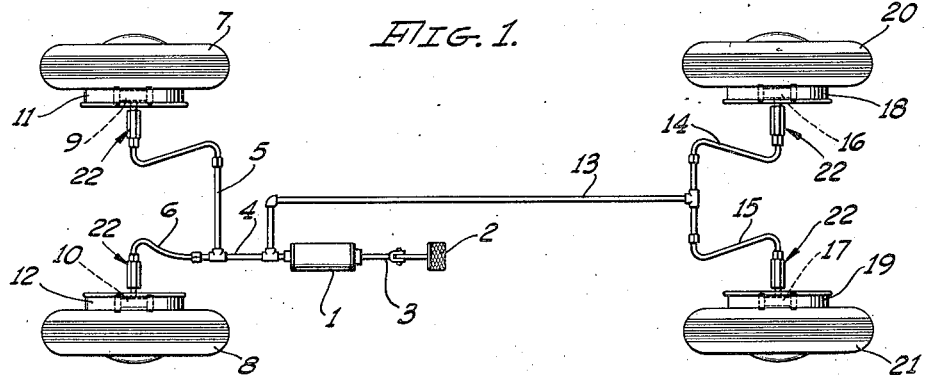
Fig. 1 is a diagrammatic view illustrating the manner in which the system of my invention is used when employed as the operating system for hydraulic brakes on an automobile or other vehicle.

Referring to the drawings, I have illustrated in Fig. 1 as a typical embodiment of my invention a hydraulic power system comprising a hydraulic braking system for automobiles or other vehicles. The system illustrated includes a master cylinder 1 within which is slidably mounted a piston (not shown) and constituting the driving element for the system. The master cylinder 1 and its pistons are, in the conventional manner, operatively connected to a brake pedal 2 as by means of a rod 3.

Upon depression of the brake pedal 2 fluid is discharged from the cylinder 1 and conveyed by means of conduits 4, 5 and 6 to the front or dirigible wheels 7 and 8 of the vehicle whereat the fluid pressure is applied to driven elements or wheel cylinders 9 and 10. These cylinders are, in the conventional manner, equipped with opposed pistons arranged to be moved in opposite directions upon the application of fluid pressure to the cylinders to thereby expand brake shoes (not shown) into frictional braking engagement with front wheel brake drums 11 and 12. At the same time fluid discharged from the master cylinder 1 is conveyed by means of lines 13, 14 and 15 to rear wheel cylinders 16 and 17 to thereby apply braking effort to rear wheel brake drums 18 and 19 associated with rear wheels 20 and 21.

The system thus far described is conventional. My invention resides in the introduction into the lines 5, 6, 14 and 15 of control elements indicated generally by the reference character 22.

Each of the elements 22 is identical and it is therefore concluded that a description of the element 22 associated with the left front wheel 8 will be a sufficient description of all of the devices 22. The device referred to is shown in detail in Fig. 2 and includes a body or cylinder member 23 provided at one end with means 24 for attachment to the wheel cylinders 10 and similar means 25 at the opposite end for attachment to the line 6.

The body member 22 is bored interiorly to define a cylinder bore 26 within which is slidably mounted a piston 27. The cylinder 26 communicates with an inlet bore 28 through which fluid is supplied from the line 6. The piston 27 constitutes a check valve housing and is accordingly interiorly bored as shown at 29 to receive a ball valve member 30 which is spring urged against a valve seat 31 to close an inlet port 32, a compression spring 33 being confined between the ball 30 and a threaded retainer ring 34 preferably screwed into the outer end of the bore 29.

Figure 2:
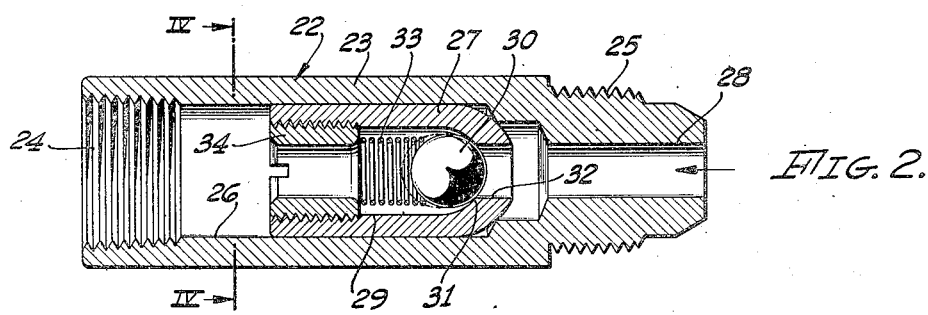
Fig. 2 is a longitudinal sectional view through a check valve mechanism forming a part of the system shown in Fig. 1 and showing the parts in the positions they normally occupy when no braking effort is being developed.

I have shown in Fig. 2 the relative positions occupied by the described parts when the system is idle and no braking effort is being developed. When the brakes are applied by the depression of the brake pedal 2, the piston 27 is slid to the left as viewed in Fig. 2 to a position such as that shown in Fig. 3 as a result of the flow of fluid into the cylinder bore 26 through the inlet bore 28. The motion of the piston 27 is arrested in a position shown in Fig. 3 by the engagement of the piston with the end of the fitting which is screwed into the threads 24.

Until this engagement is obtained, the check valve 30 remains closed as shown in Fig. 2 since there is no pressure differential available to open the valve. However, when the piston 27 is arrested and additional pressure is applied at the inlet bore 28 as a result of further depression of the brake pedal 2, the check valve 30 will open to a position such as that shown in Fig. 3 to permit additional fluid to pass through the port 32 around the ball 30 and through the interior bore 29, thus applying additional pressure to the brake cylinder 10 and further separating the two pistons contained therein.

Figure 3:
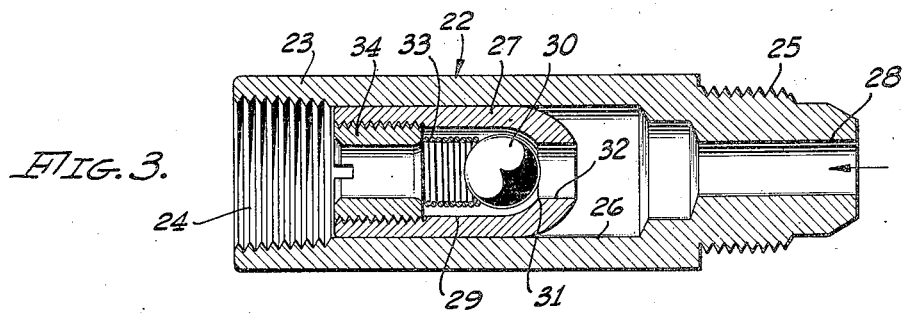
Fig. 3 is a view similar to Fig. 2 but illustrating the relative positions of the parts when the brakes are applied.
Figure 4:
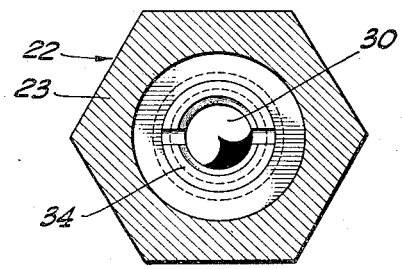
Fig. 4 is a cross sectional view taken substantially along the line IV—IV of Fig. 2.

When the brakes are released as by removing the force which has been applied to the brake pedal 2, the brake shoe springs which are included in the usual braking mechanism and which tend to withdraw the shoes from engagement with the brake drum 12 will cause a return flow of fluid from the brake cylinder 10 into the bore 26, thus causing the return of the piston 27 from the position shown in Fig. 3 to the position shown in Fig. 2, it being realized that the check valve 30 is moved to its closed position such as is shown in Fig. 2 immediately upon the equalization of the pressure between the inlet bore 28 and the cylinder bore 26.

As soon as the piston 27 arrives at its initial position which is shown in Fig. 2, further flow of fluid from the wheel cylinder 10 is arrested and the brake shoes are then held in a corresponding position. If at this time the brake pedal has not returned to its initial position, the subsequent return of the brake pedal to the initial position will introduce into the master cylinder 1 additional fluid from the reservoir normally associated with such cylinders in the conventional master cylinder constructions.

A second application of the brakes in the manner described will probably not result in the opening of the check valve 30 since no more physical movement of the brake shoes is permitted than was permitted in the first instance. However, as the brakes are applied from time to time, the brake lining material will be gradually worn away so that upon each new application of the brakes a small quantity of fluid will move past the check valve 30 so that the normal retracted position of the brake shoes will be continually advanced at the same rate as the brake lining is worn away. This insures that there will at all times be made available an adequate stroke of the master piston to insure the development of full braking effort.

It will be seen that the parts must be so adjusted that the permissible movement of the piston 27 will be at least sufficient to pass to the wheel cylinder 10 that amount of fluid which is required to move the brake shoes from a position just clear of the brake drums to a position corresponding to the development of maximum braking effort. If less movement of the piston 27 were to be permitted, depression of the brake pedal would shift the normal retracted position of the shoes outwardly a distance sufficient to cause the brakes to drag.

I have shown in Figs. 5 through 8 a modified form of control element 22, the form in these figures being arranged to provide at the wheel cylinders an increased operating pressure.

The form of the invention which is shown in Figs. 5 through 8 comprises a cylinder body 35 which is bored internally to define a cylinder bore 36 within which is slidably mounted a piston 37 carrying a piston ring or plunger washer 38. The cylinder 35 is provided with an integral inlet closure 39 which is provided with means 40 for attachment to the conduit 6. The opposite end of the cylinder 35 is preferably closed as by means of a closure plate 41 which is provided with means 42 for attachment to the wheel cylinder 10. The closure 41 also carries an inwardly extending boss 43 which is bored as indicated at 44 to define a cylinder bore within which is received a reduced diameter portion 45 of the piston 37, an adequate seal between the portion 45 and the cylinder bore 44 being obtained by as by means of a cup washer 46.

The cup washer 46 is bored as indicated at 47 to provide a fluid interconnection between the cylinder bore 44 and an internal bore or interior cylinder 48 of the piston portion 45.

Within the bore 48 is slidably mounted a check valve carrier 49 which is bored as indicated at 50 to receive a ball check valve 51 normally urged to the right as shown in Fig. 5 as by means of a spring 52 into engagement with a ball valve seat defined by the bore 50 and a small diameter bore 53. The spring 52 is confined between the ball 51 and a collar 54 threaded into the left-hand end of the bore 50. The inner cylinder bore 48 is provided with a reduced diameter continuation 55 which communicates with the right-hand end of the piston 37. The piston 37 is normally urged to the right as shown in Fig. 5 by means of a compression spring 56 which is confined between the piston 37 and the closure plate 41. A bleeder hole 58 may be provided through the wall of the cylinder 35 to permit air to be exhausted upon movement of the piston 37 to the left as shown in Fig. 5.

With the apparatus just described, depression of the brake pedal will force fluid into the interior of the cylinder housing 35 through the inlet 40 at the right-hand end of the piston 37. This fluid will be conducted through the bore 55 and will result in the check valve carrier 49 being slid to the left along the bore 48 to the position which is shown in Fig. 6, with the resultant displacement of fluid through the discharge 42 and the application of a corresponding pressure to the wheel cylinder 10.

Further depression of the brake pedal 2 will cause the development within the bore 48 of a sufficient pressure to dislodge the check valve 51 from its seat and to permit fluid to flow through the openings 53 and 50 to supply additional fluid to the wheel cylinder 10. It will be recognized that during this phase of the operation, the compression spring 56 has served to hold the piston 37 in its right-hand position as shown in Figs. 5 and 6. As soon, however, as the brake shoes are engaged with the brake drum, a back pressure is developed to cause a substantial pressure rise within the bore 44 and within the bore 36 to the right of the piston 37. This applies an equal pressure to the piston portion 45 and to the piston portion 37 but because of the larger area of the portion 37, there will be developed a resultant force tending to urge the piston 37 to the left against the force of the spring 56. When this resultant force rises to a value sufficient to overcome the force of the spring 56, the piston 37 will move to the left toward a position such as that shown in Fig. 7.

As the piston 37 moves to the left, the fluid displaced from the chamber 44 will flow through the passage 47 to force the check valve carrier 49 to its furthest right-hand position as shown in Fig. 7. Thereafter the increase in pressure within the cylinder 36 to the right of the piston 37 will effect a further displacement of the piston 37 to the left and the development within the chamber 44 of a fluid pressure which is greater than that exerted on the piston 37, the magnitude of the pressure in the cylinder 44 with respect to that applied to the piston 37 being proportional to the relative areas of the piston 37 and the small piston portion 46.

Upon release of pressure from the brake pedal 2, the resulting drop in pressure will permit the spring 56 to start moving the piston 37 to the right toward the position illustrated in Fig. 5. At the same time the check valve 51 is held closed by the spring 52 so that the fluid returned from the brake cylinder will be equal to the displacement of the small diameter piston portion 46 resulting from the movement of the piston 37 from the position shown in Fig. 7 to the position shown in Fig. 5.

Fluid flow from the wheel cylinder 10 will be arrested at the time the piston 37 reaches its extreme right-hand position as shown in Fig. 5.

It will be seen that since the force of the spring is balanced by the force developed on the piston 37 which is equal to the differential area times the differential pressure in the system, the apparatus will operate to apply to the wheel cylinder 10 an operating pressure substantially greater than the pressure developed by the master cylinder 1. Also assuming that in the first instance some fluid is moved past the ball check 51, the amount of fluid returned to the master cylinder from the brake cylinder will be less than the amount previously moved in the opposite direction, with the result that the retracted position of the brake shoes will be somewhat advanced from the previous retracted position. A subsequent operation will ordinarily not result in movement of any fluid past the ball check 51 but as the brake lining wears away in response to repeated operation of the brakes, an additional small amount of fluid will be injected past the check valve 51 upon each operation of the brakes so that the brake shoes are always held, when released, at a position just clearing the brake drum.

From the foregoing it will be observed that I have provided a hydraulic power transmission system which is characterized by providing control members for permitting only a limited return flow of fluid from the driven elements to the driving element. Thus, in the case of a hydraulic braking system for automobiles or other vehicles, the wear in the brake linings is automatically taken up by the control devices so that a maximum effective pedal stroke is maintained at all times without requiring periodic adjustment of the brake shoe stops.

It will also be observed that I have illustrated a modified type of control device which in addition to controlling the amount of return movement of the driven element as in the first described modification, operates to provide a much greater operating pressure than is produced by the master cylinder.

While I have shown and described the preferred embodiment of my invention, I do not desire to be limited to any of the details of construction shown or described herein, except as defined in the appended claim.

I claim:

In a control device for hydraulic power transmission systems, the combination of: a cylinder housing defining a cylinder bore having a large diameter portion and a small diameter portion; means closing each end of said cylinder housing and providing connection to fluid conduits; a piston reciprocal in said bore having a large diameter portion and a small diameter portion fitted respectively into said large and small diameter bore portions, said piston having a fluid passage extended axially therethrough; a tubular valve carrier slidably mounted in said passage and having an opening extending longitudinally therethrough; a check valve on said carrier normally closing said opening to positively prevent flow of fluid from said small diameter bore portion toward said large diameter bore portion; and spring means normally urging said piston toward the large diameter bore portion of said cylinder housing.

ARTHUR H. HOPMANS.